United States Patent
Hyun et al.

(10) Patent No.: US 10,376,116 B2
(45) Date of Patent: Aug. 13, 2019

(54) VACUUM CLEANER

(71) Applicant: LG ELECTRONICS INC., Seoul (KR)

(72) Inventors: Kietak Hyun, Seoul (KR); Jungmin Ko, Seoul (KR); Soohan Eo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 142 days.

(21) Appl. No.: 15/790,372

(22) Filed: Oct. 23, 2017

(65) Prior Publication Data

US 2019/0014962 A1   Jan. 17, 2019

(30) Foreign Application Priority Data

Jul. 12, 2017 (KR) .......................... 10-2017-0088549

(51) Int. Cl.
*B01D 41/00* (2006.01)
*A47L 9/20* (2006.01)
(Continued)

(52) U.S. Cl.
CPC .................. *A47L 9/20* (2013.01); *A47L 5/362* (2013.01); *A47L 9/108* (2013.01); *A47L 9/125* (2013.01);
(Continued)

(58) Field of Classification Search
CPC ........ A47L 9/20; A47L 9/1675; A47L 9/1633; A47L 9/1641; A47L 9/1683; A47L 9/108;
(Continued)

(56) References Cited

U.S. PATENT DOCUMENTS

| 6,521,006 B2 * | 2/2003 | Park | A47L 5/362 |
| | | | 15/352 |
| 7,318,848 B2 * | 1/2008 | Lee | A47L 9/102 |
| | | | 15/347 |

(Continued)

FOREIGN PATENT DOCUMENTS

| CN | 201755194 | 3/2011 |
| EP | 1707094 | 4/2012 |

(Continued)

OTHER PUBLICATIONS

International Search Report dated Apr. 6, 2018 issued in Application No. PCT/KR2017/008095.

(Continued)

*Primary Examiner* — Dung H Bui
(74) *Attorney, Agent, or Firm* — KED & Associates, LLP

(57) ABSTRACT

The present disclosure relates to a vacuum cleaner for separating and collecting dust and other contaminants by using a multi-cyclone and a mesh filter, including a cleaning unit for sweeping dust and foreign materials attached to the mesh filter along an outer circumferential surface of the mesh filter, and a rotation unit coupled to the cleaning unit for rotating the cleaning unit relative to the mesh filter, whereby the cleaning unit can clean a surface of the filter automatically or manually during an operation of the cleaner, so that the filter surface can be kept clean, and a load on a fan unit caused due to foreign materials or dust can be reduced.

15 Claims, 9 Drawing Sheets

(51) Int. Cl.
  *A47L 9/16* (2006.01)
  *A47L 5/36* (2006.01)
  *A47L 9/12* (2006.01)
  *A47L 9/10* (2006.01)
  *B01D 45/16* (2006.01)
  *B01D 46/00* (2006.01)
  *B01D 46/10* (2006.01)
  *B01D 50/00* (2006.01)
  *B01D 45/12* (2006.01)

(52) U.S. Cl.
  CPC .......... *A47L 9/165* (2013.01); *A47L 9/1633* (2013.01); *A47L 9/1641* (2013.01); *A47L 9/1666* (2013.01); *A47L 9/1675* (2013.01); *A47L 9/1683* (2013.01); *B01D 45/12* (2013.01); *B01D 45/16* (2013.01); *B01D 46/0065* (2013.01); *B01D 46/10* (2013.01); *B01D 46/106* (2013.01); *B01D 50/002* (2013.01); *B01D 2279/55* (2013.01)

(58) Field of Classification Search
  CPC ........ A47L 9/125; A47L 9/1666; A47L 5/362; A47L 9/165; B01D 46/106; B01D 45/16; B01D 46/10; B01D 46/0065; B01D 50/002; B01D 2279/55
  See application file for complete search history.

(56) References Cited

U.S. PATENT DOCUMENTS

| | | | | |
|---|---|---|---|---|
| 7,704,290 B2* | 4/2010 | Oh | ........................ | A47L 9/1666 15/352 |
| 8,327,487 B2* | 12/2012 | Kunz | ........................ | A47L 9/20 15/3 |
| 8,951,319 B2* | 2/2015 | Kim | ........................ | B01D 45/14 15/347 |
| 9,980,619 B2* | 5/2018 | Cho | ........................ | A47L 5/362 |
| 2001/0025395 A1* | 10/2001 | Matsumoto | ............. | A47L 9/108 15/353 |
| 2003/0019074 A1* | 1/2003 | Oh | ........................ | A47L 9/1691 15/352 |
| 2003/0159235 A1* | 8/2003 | Oh | ........................ | A47L 9/1666 15/352 |
| 2003/0208879 A1* | 11/2003 | Oh | ........................ | A47L 9/1666 15/352 |
| 2003/0221278 A1* | 12/2003 | Oh | ........................ | A47L 9/1675 15/352 |
| 2004/0177471 A1* | 9/2004 | Jung | ..................... | A47L 9/1675 15/352 |
| 2004/0187253 A1* | 9/2004 | Jin | ........................ | A47L 9/20 15/352 |
| 2004/0200029 A1* | 10/2004 | Jin | ........................ | A47L 9/1675 15/352 |
| 2005/0132528 A1* | 6/2005 | Yau | ........................ | A47L 5/24 15/344 |
| 2006/0042202 A1* | 3/2006 | Lee | ........................ | A47L 9/0081 55/289 |
| 2008/0295466 A1* | 12/2008 | Cha | ........................ | A47L 9/122 55/296 |

FOREIGN PATENT DOCUMENTS

| | | |
|---|---|---|
| JP | 2013-183760 | 9/2013 |
| KR | 10-2004-0023417 | 3/2004 |
| KR | 10-0479377 | 3/2005 |
| KR | 10-0485708 | 4/2005 |
| KR | 10-2006-0112420 | 11/2006 |
| KR | 10-1526292 | 6/2015 |
| KR | 10-2016-0038570 | 4/2016 |
| KR | 10-2016-0073820 | 6/2016 |

OTHER PUBLICATIONS

Korean Notice of Allowance dated May 27, 2019 issued in Application No. 10-2017-0088549.

* cited by examiner

VACUUM CLEANER

CROSS-REFERENCE TO RELATED APPLICATION(S)

This application claims priority under 35 U.S.C. § 119 to Korean Application No. 10-2017-0088549, filed on Jul. 12, 2017, whose entire disclosure is hereby incorporated by reference.

BACKGROUND

1. Field

The present disclosure relates to a vacuum cleaner for separating and collecting foreign materials, dust, and fine dust using a multi-cyclone.

2. Background

A vacuum cleaner is an apparatus that may generate a suction force to draw air in into the vacuum cleaner, filter the suctioned air to remove and collect foreign materials, dust, fine dust, and other contaminants contained in the air, and then discharge cleaned air back to an outside of the vacuum cleaner. Vacuum cleaners may be classified into various types based on, for example, structures or functionalities of the vacuum cleaners. For example, types of vacuum cleaners may include i) a canister type, ii) an upright type, iii) a hand type, and iv) a cylindrical floor type.

The canister type vacuum cleaner is presently the most widely used type of vacuum cleaner in households. The canister type vacuum cleaner may have a structure in which a suction unit (or suction head) and a cleaner body may be separated from each other and may be connected, for example, with a hose. In general, the canister type vacuum cleaner may be suitable for cleaning an uncarpeted floor because certain types of suction units may exclude a rotary brush such that cleaning may be performed by suctioning air through the suction unit.

In contrast to the canister type, the upright type vacuum cleaner may have a structure in which the suction unit may be integrally formed in the cleaner body. Generally, the upright type vacuum cleaner may be provided with a rotary brush in the suction unit, and thus, may be relatively advantageous for removing dust and other contaminants from a carpet.

Recently, a cyclone-type separator has been used to separate particles such as dust from an air stream suctioned into a vacuum cleaner. Known cyclone devices may pass air through at least two cyclones. The two cyclones may include, for example, a first cyclone having a filter to separate larger dust and foreign materials from an airflow, and a second cyclone that separates relatively small particles (e.g., fine dust) from the airflow passed through and filtered by the first cyclone and the filter contained therein.

Most of the foreign materials or dust that are separated through the first cyclone may fall from the filter to be collected within a dust storage unit (or dust storage chamber) provided below the filter within the dust collector of the vacuum cleaner.

However, in some cases, the foreign materials or the dust may be trapped or accumulated on the filter, thereby blocking or otherwise reducing an area of the filter through which the air can pass. This accumulation of dust and other materials on the filter may increase a load on a fan unit (or fan motor) that provides the suction force, and also may cause the filter to appear dirty and visually unappealing to the user.

Certain vacuum cleaners may be equipped with a mechanism such as a cleaning unit (such as a wiper or filter agitator) that removes foreign materials or dust attached on an outer circumferential surface of a filter. However, when cleaning the filter, some foreign materials or dust may be caught by the cleaning unit and, thus, may accumulate on the cleaning unit without moving to the dust storage unit for storage and removal.

In addition, a variety of air flows including a high-speed rotation flow due to the suction force of the fan unit may be present within the dust collector (e.g., through the multiple cyclones). The variety of air flow may interact to create eddies or other flow patterns that may obstruct the introduction of foreign materials and dust into the dust storage unit. Also, the dust and other materials collected in the dust storage unit may be agitated by the air flows such that some of the collected dust or other materials may float to flow backward or scatter out of the dust storage unit to the filter, eventually of blocking some of the through holes of the filter. Consequently, inefficiencies in collecting the dust or other contaminants in the dust storage unit may cause deterioration of not only a dust collecting performance but also may reduce a cleaning performance of the vacuum cleaner. Therefore, a structure capable of preventing the backward flow or scattering of the dust that has been filtered by the first cyclone and collected in the dust storage unit may be desirable.

An example of a known vacuum cleaner is described in Korean Patent Publication No. 10-2004-0023417 (published on Mar. 18, 2004). The above reference is incorporated by reference herein where appropriate for appropriate teachings of additional or alternative details, features and/or technical background.

BRIEF DESCRIPTION OF THE DRAWINGS

Embodiments will be described in detail with reference to the following drawings in which like reference numerals refer to like elements and wherein.

DETAILED DESCRIPTION

Figure 1:
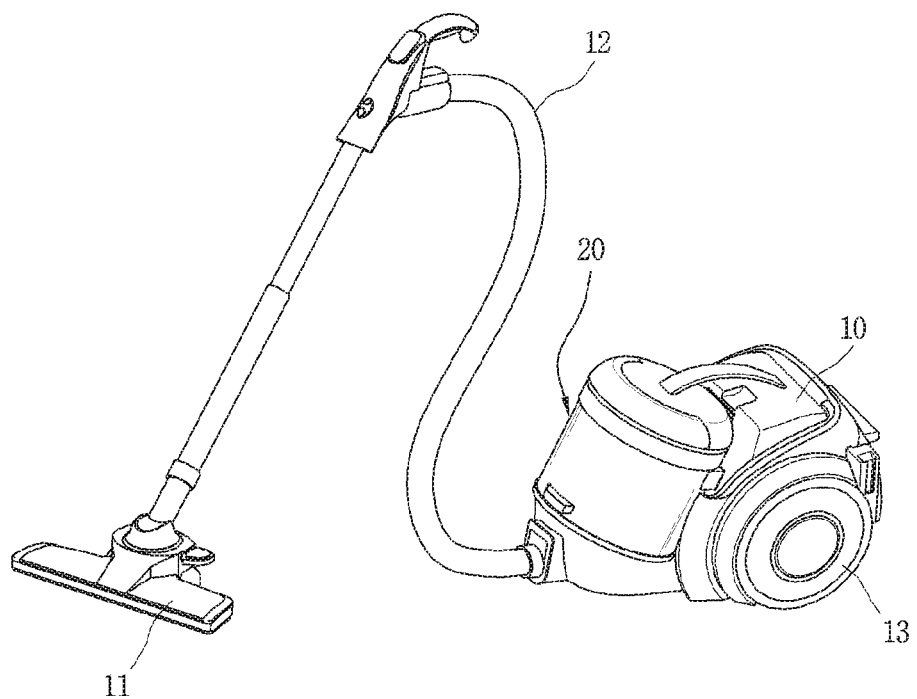
FIG. 1 is a perspective view illustrating a vacuum cleaner according to one embodiment of the present disclosure.
Figure 2:
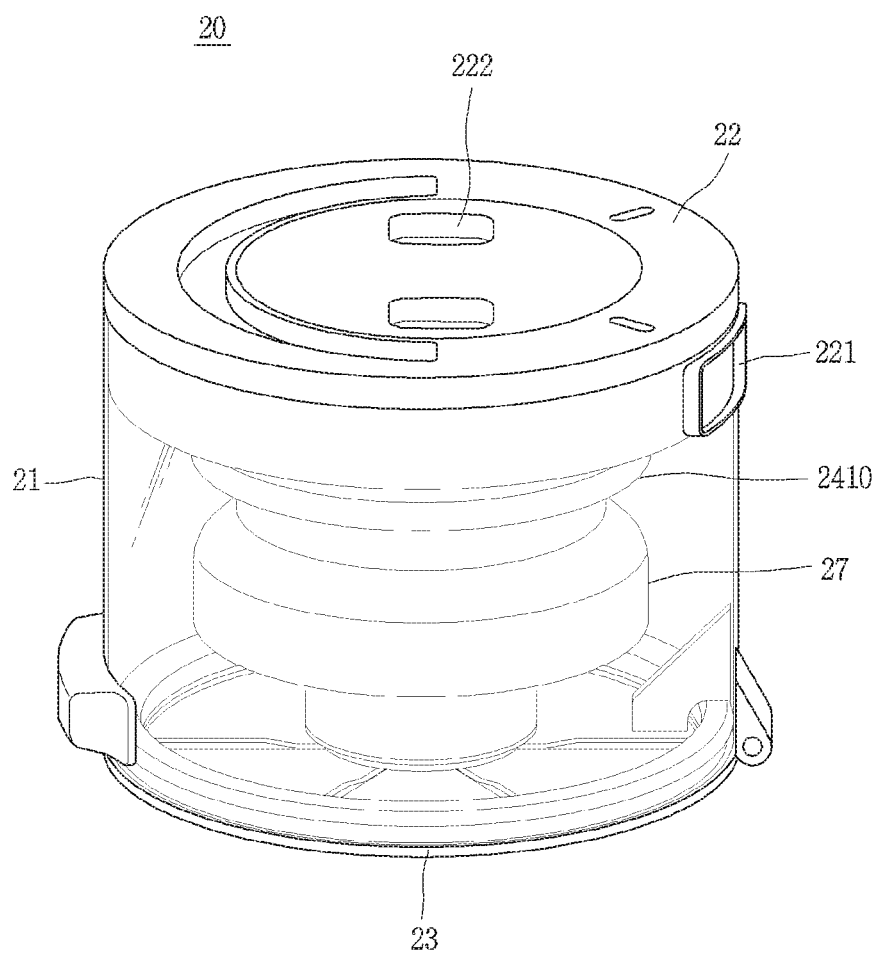
FIG. 2 is a perspective view illustrating a dust collector of FIG. 1.

Hereinafter, a vacuum cleaner according to embodiments of the present disclosure will be described in detail with reference to the drawings. FIG. 1 is a view illustrating a vacuum cleaner according to one embodiment of the present disclosure. As shown in FIG. 1, a vacuum cleaner may include a cleaner body 10, a suction unit (or suction head) 11, a connection unit (or hose) 12, a wheel unit (or wheels) 13, and a dust collector 20.

The cleaner body 10 may be provided with a fan unit (not illustrated) for generating a suction force. For example, the fan unit may include a suction motor and a suction fan rotated or otherwise driven by the suction motor to generate a suction force or vacuum to draw air into the cleaner body. The cleaner body 10 may be in fluid communications with the suction unit 11 such that the suction force may cause the suction unit 11, when positioned close to or in contact with a surface to be cleaned such as a floor, to suction air adjacent thereto. The suctioned air may carry foreign materials, dust, fine dust, ultrafine dust, and/or other contaminants.

The connection unit 12 may be connected to the suction unit 11 and the dust collector 20, respectively, so that the air containing foreign materials, dust, fine dust, ultrafine dust, and other contaminants, may be suctioned through the suction unit 11 and transferred to the dust collector 20. The connection unit 12 may be configured in a form of a hose or pipe that provides a fluid path for the suctioned air. The connection unit 12 may be directly connected to the dust collector 20 or may communicate with the cleaner body 10, so that the air suctioned through the suction unit 11 can be introduced into the dust collector 20. FIG. 1 illustrates a state in which the connection unit 12 is connected to the cleaner body 10, and in another state, the connection unit 12 may be uncoupled from the cleaner body 10.

The wheel unit 13 may be rotatably coupled to the cleaner body 10, to allow the cleaner body 10 to be movable or rotatable in various directions along a surface, such as the floor being cleaned. In one example, the wheel unit 13 may include main wheels and a sub wheel. The main wheels may be respectively provided on both sides of the cleaner body 10. The sub wheel may support the cleaner body 10 together with the main wheels and assist the movement of the cleaner body 10 by the main wheels.

It should be appreciated that the suction unit 11, the connection unit 12, and the wheel unit 13 depicted in FIG. 1 are provided merely as an example of one possible configuration, and in other embodiments of the present disclosure, various other types of the suction unit 11, the connection unit 12, and the wheel unit 13 can be implemented by employing the corresponding components provided in related art vacuum cleaners, so a more detailed description thereof is omitted. For example, the vacuum cleaner may be an upright or handheld vacuum cleaner that directly couples the suction unit 11 to the main body 10 such that the connection unit 12 may be omitted.

The dust collector 20 may be detachably coupled to the cleaner body 10. For example, the dust collector 20 may be uncoupled from the cleaner body 10 for cleaning to remove collected dust and other contaminants. The dust collector 20 filters suctioned air to separate and collect foreign materials, dust, and/or fine dust from suctioned air, and discharges the filtered air. For reference, the present disclosure describes the dust collector 20 as being applied to a canister type vacuum cleaner, but the dust collector 20 is not limited solely to the canister type vacuum cleaner. For example, the dust collector 20 according to the present disclosure may also be applied to an upright type vacuum cleaner or other type of vacuum cleaner.

As shown in FIGS. 2-7, a suction force generated by the fan unit in the cleaner body 10 may cause external air to be drawn through the suction unit 11, carried via the connection unit 12, and then introduced into the dust collector 20. The dust collector 20 may include an outer case 21, an upper cover 22, a lower cover 23, and a multi-cyclone.

Figure 5:
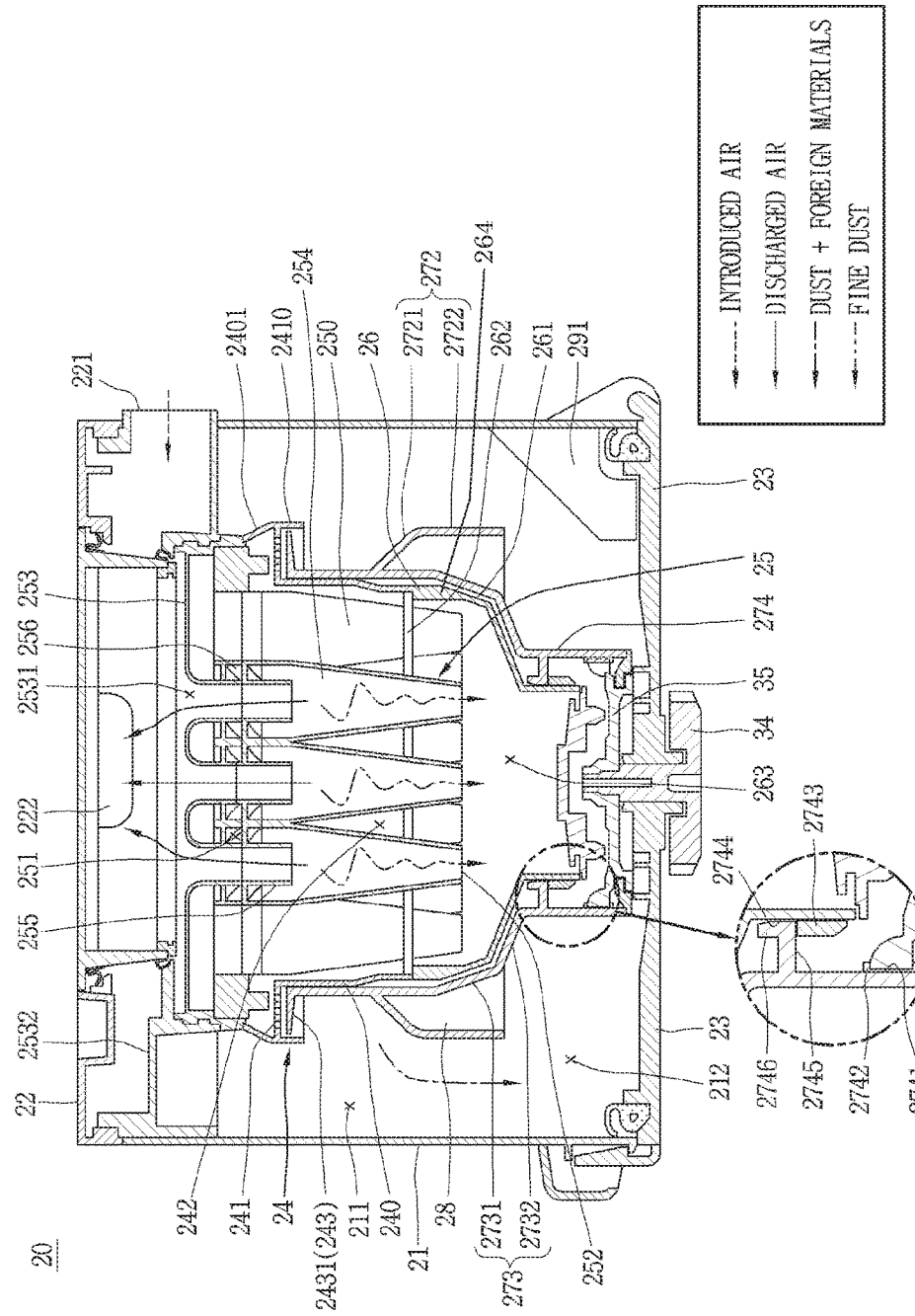
FIG. 5 is a sectional view taken along the line V-V in FIG. 2.

The outer case 21 may define an outer appearance of the dust collector 20 and may be formed in a cylindrical shape. For example, the outer case 21 may have upper and lower openings to receive the upper and lower covers 22 and 23. A dust storage unit (or dust storage chamber) 212 for storing foreign materials and dust therein may be positioned inside the outer case 21 (e.g., within a space contacting the lower cover 22, as shown in FIG. 5).

The upper cover 22 may be provided to cover the upper portion of the outer case 21 and to form an upper appearance of the dust collector 20. The upper cover 22 may be provided with an intake guide (or intake path) to direct suctioned air into the dust collector 20 and an exhaust guide (or exhaust path) direct filtered air out from the dust collector 20. An inlet 221 of the intake guide may be connected to the connection unit 12 and may extend toward an inner circumference of the outer case 21, so that suctioned external air may be tangentially introduced into the outer case 21, and swirls along the inner circumference of the outer case 21. The exhaust guide may be configured to externally discharge air, from which foreign materials, dust, etc. have been separated by the multi-cyclone. The inlet 221 may be positioned at an end of the intake guide to be connected to or otherwise be in fluid communications with the connection unit 12. The inlet 221 may be formed to be opened toward a side surface of the outer case 21. A shaped (e.g., rectangular) intake hole may be formed through one side of an upper end portion of the side surface of the outer case 21, so that the inlet 221 of the intake guide can extend through the intake hole. With this structure, the external air can be introduced through the outer case 21 and into the intake guide through the inlet 221.

Multiple (e.g., a pair) of outlets 222 may be provided on an output end of the exhaust guide. The pair of outlets 222 may protrude or output air upward and may be spaced apart from each other in a radial direction on the upper cover 22. Also, the pair of outlets 222 may be open, respectively, in a manner of communicating with the outside of the outer case 21 in opposite directions to each other (e.g., to output filtered air in opposite radial directions). Air discharged through the outlets 222 of the dust collector 20 may be discharged to the outside through an exhaust port (not illustrated) of the cleaner body 10.

A porous prefilter (not illustrated) configured with relatively small openings to filter ultrafine dust or other particles from the air may be installed on a passage extending from the outlet of the dust collector 20 to the exhaust port of the cleaner body 10. For example, the prefilter may be provided at the outlets 222 or within the cleaner body 10

The upper end portion of the outer case 21 may be configured to surround an outer circumferential side surface of the upper cover. An upper surface of the upper cover 22 may be formed in a flat shape without protruding upward from the upper end of the outer case 21. The intake guide formed beneath the upper surface of the upper cover 22 in the circumferential direction may be accommodated in the outer case 21. This may result in reducing a height of the dust collector.

The lower cover 23 may be provided to cover the lower portion of the outer case 21 and may be coupled to the lower portion of the outer case 21 by a hinge. Accordingly, the lower cover 23 may be rotatable around the hinge to selectively open and close the dust storage unit 212 of the outer case 21 while remaining coupled to the outer case at the hinge. The cleaner may operate in the closed state of the lower cover 23. When the lower cover 23 is opened, foreign materials, dust and other contaminants stored in the dust storage unit 212 may be discharged downward, e.g., to clean the dust storage unit 212.

The term "multi-cyclone" may refer to a presence of multiple cyclones, for example, at least two cyclones. A "cyclone" refers to a device that may separate particles (such as various sizes of dust) from a fluid containing the particles by a centrifugal force generated by making a swirling flow of the fluid. The cyclone may separate foreign materials, dust, and fine dust from air introduced into the dust collector 20 by the suction force of the fan unit. In the following discussion, relatively large particles may be referred to as "dust," relatively smaller particles may be referred to as "fine dust," and particles smaller than "fine dust" may be referred to as "ultrafine dust."

The multi-cyclone in the dust collector 20 may include a first cycle 24 and a second cyclone 25 (see, for example, FIG. 5). The first cyclone 24 may be installed inside the outer case 21. The first cyclone 24 may be provided at an upper portion within the outer case 21 (e.g., near the inlet 221). The first cyclone 24 may be configured to filter out foreign materials and dust from the introduced air, and to output filtered air from which the foreign materials and dust have been filtered.

Figure 4:
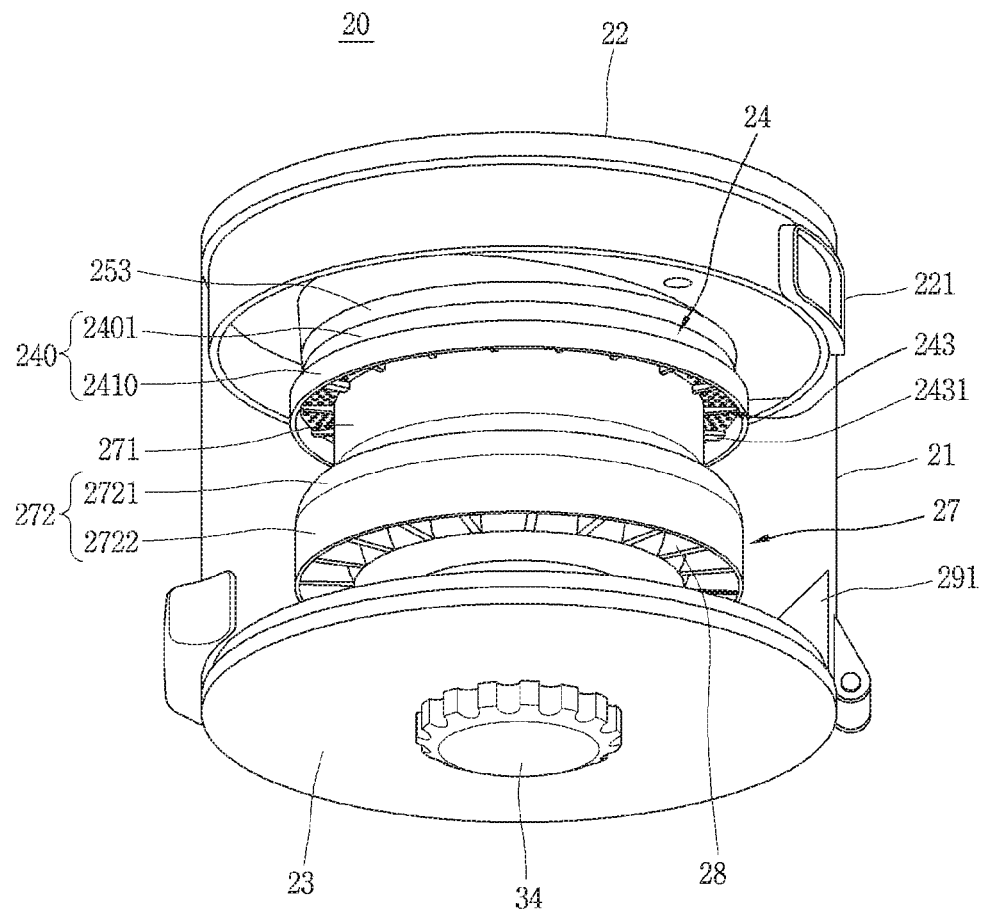
FIG. 4 is a bottom perspective view of FIG. 2.

As shown in FIGS. 4 and 5, the first cyclone 24 may include a housing 240 and a mesh filter 241. The housing 240 may define an outer appearance of the first cyclone 24 and may be formed in a cylindrical shape, similar to the outer case 21. A supporting portion (or supporting wall) 2401 for coupling with a cover member 253, which will be described later, may protrude upward from the housing 240. For example, the supporting portion 2401 may be inclined so that its diameter becomes narrower toward its top from an end portion of an outer circumferential portion of the mesh filter 241. A top edge of the supporting portion 2401 may be coupled to an outer circumferential portion of the cover member 253. The cover member 253 and the supporting portion 2401 may be coupled to each other in various forms, such as a protrusion, a hook, a groove, or other connection structure. The housing 240 may be formed in a shape having a hollow interior to accommodate the second cyclone 25 therein.

The mesh filter 241 may protrude radially from an upper end portion of the housing 240 and may be connected to a lower end portion of the supporting portion 2401. The mesh filter 241 may be provided horizontally along a circumferential direction. The mesh filter 241 may have a mesh or porous shape so that air can pass there through. The mesh filter 241 may separate foreign materials and dust from the air introduced into the housing 240. The porous type filter 241 may have a plurality of through holes. The plurality of through holes may be formed in a vertically penetrating manner, and air may flow upward through the through holes of the mesh filter to be introduced into the housing 240 (e.g., such that contaminants larger than the through-holes of the mesh filter 241 are removed from the air before the air is introduced within the housing 240).

In contrast to known vacuum cleaners in which a filter extends vertically (e.g., with horizontal through holes), the mesh filter 241 may be positioned at the upper end of the outer circumferential portion of the housing 240 such that the through holes of the mesh filter 241 may vertically extend between the upper cover 22 and the lower cover 23. The mesh filter 241 may outwardly protrude in a radial direction from the perpendicular outer circumferential surface of the housing 240, so that a gap between the lower cover 23 and the filter 241 may be maintained constantly.

The filter 241 may have the following effects. First, since the filter 241 may be provided horizontally, heights of the first cyclone 24 and the dust collector 20 can be reduced. Second, since air passing through the mesh filter 241 flows upward, the air may be introduced into an inlet port 251 provided through an upper end of a casing 250 of the second cyclone 25. Accordingly, a length of an air flow path can be shortened and flow resistance can be reduced. Third, since the foreign materials or dust filtered by the mesh filter 241 may be collected on a bottom surface of the mesh filter 241, an attached direction (upward direction) of the foreign materials or dust on the mesh filter 241 may be opposite to a direction of gravity. As a result, an attachment force of the foreign materials or dust can be decreased, thereby reducing clogging of the filter 241 as connected materials fall from the bottom surface of mesh filter 241 to the dust collection unit 212.

The filter guide 2410 may be formed to protrude downward from the outer circumferential portion of the mesh filter 241. The filter guide 2410 may extend along the circumferential direction. The filter guide 2410 may be provided so that air introduced into an annular space between the outer case 21 and the first cyclone covers the side surface of the outer circumferential portion of the mesh filter 241. According to the structure of the filter guide 2410, when the air in the annular space passes through the mesh filter 241 from the lower portion to the upper portion by the suction force, the filter guide 2410 may block a radial flow of the air within the annular space, so as to switch the flow of the air into a direction from lower to upper sides of the filter guide 2410. That is, when the air in the annular space flows into the inside from the outside of the filter guide 2410 in the radial direction, the airflow may be switched from the radial direction to an up-and-down direction by virtue of the downward protruding structure of the filter guide 2410. The air can smoothly flow from the lower to upper portions through the through holes of the mesh filter 241.

A criterion of sizes for distinguishing dust and fine dust from each other may be determined by the mesh filter 241. Small dust passing through openings in the mesh filter 241 (e.g., to be carried by the air flow to second cyclone 25) may be classified as "fine dust," and large dust that fails to pass through the openings the mesh filter 241 and is collected therein may be classified as "dust."

Hereinafter, a process of separating foreign materials and dust through the first cyclone 24 will be described in detail. Air containing foreign materials, dust and fine dust may be introduced into the annular space 211 between the outer case 21 and the first cyclone 24 through the outlets of the intake guide, and swirls in the annular space 211. During this process, relatively heavy foreign materials and dust gradually flow downward while swirling spirally along the annular space 211 by centrifugal force, so as to be collected in the dust storage unit 212, which will be described later.

The foreign materials and dust filtered through the first cyclone 24 may be collected into the dust storage unit 212 located at the lower portion within the outer case 21. The dust storage unit 212 may also be referred to as a foreign material-dust storage unit 212 in that it forms a space for storing the foreign materials and dust. Referring to FIG. 5, an inner circumferential surface of the outer case 21 and a rotation unit (or rotation wall) 27 may form the dust storage unit 212. A bottom surface of the dust storage unit 212 may be formed by the lower cover 23. Meanwhile, unlike the foreign materials and dust, the air may be introduced into the housing 240 through the mesh filter 241 by the suction force. Fine dust that is relatively lighter/smaller than the dust may be introduced into the housing 240 together with the air through the mesh filter 241.

Referring to FIG. 5, an internal structure of the dust collector 20 and the flow of air in the dust collector 20 will be described. The second cyclone 25 may be provided inside the first cyclone 24 to separate the fine dust (e.g., dust that passes through the mesh filter 241) from the air introduced therein through the inlet port 251. As illustrated in FIG. 5, the second cyclone 25 may be provided in plurality. The second cyclone 25 may be positioned and designed such that a central axis of the second cyclone 25 may extend in parallel with a central axis of the first cyclone 24.

The second cyclone 25 may be configured to be accommodated within the first cyclone 24. For example, a group of the second cyclone 25 may be provided in plurality and may be positioned along the circumference of the first cyclone 24, and other second cyclones 25 may also be arranged within the group of second cyclones 25 arranged in the circumferential direction. According to this structure, the height of the dust collector 20 can be lowered, as compared with the other multi-cyclone structures in which the first and second cyclones are separately provided at the upper and lower portions, respectively, of a dust collector.

The first and second cyclones 24 and 25 may be positioned adjacent to each other to form a first space 242. For example, an empty space between the first cyclone 24 and the outside of the second cyclone(s) 25 may be understood as a first space 242. The first space 242 may form a flow path for introducing air and fine dust, which have flowed into the first cyclone 24, into an upper portion of the second cyclone 25.

Each of the second cyclones 25 may extend in a substantially up-and-down (e.g., vertical) direction. The plurality of second cyclones 25 may be provided to extend substantially parallel to one another. According to this arrangement, the first space 242 may extend in the vertical direction within the first cyclone 24 and between the second cyclones. The inlet port 251 may be formed through an upper portion of each second cyclone 25, and an outlet port 252 may be formed through a lower portion of each second cyclone 25.

The second cyclones 25 may be provided adjacent to each other and may be arranged to be in contact with each other. For example, a casing 250 having a substantially conical shape and forming an appearance of any one of the second cyclones 25 may be provided to be in contact with a casing 250 of another second cyclone 25 adjacent thereto, so as to form the first space 242 between the adjacent casing 250. Each of the casings 250 of the second cyclones 25 may be integrally formed with each other. With this structure, the plurality of second cyclones 25 may be modularized and installed within the first cyclone 24.

The second cyclone 25 may have a circular shape when viewed from a top. A group of the second cyclones 25, which may be arranged along the inner circumference of the first cyclone 24, may be positioned to be brought into contact with the inner circumferential surface of the first cyclone 24. Specifically, the inner circumferential surface of the housing 240 of the first cyclone 24 and the outer circumferential surface corresponding to a cylindrical portion of the casing 250 of the second cyclone 25 may be provided to be in contact with each other.

According to this arrangement, the second cyclones 25 can be efficiently provided within the first cyclone 24. In particular, since the second cyclones 25 of the present disclosure may be not separately provided with a guide passage extending from one side of the related art second cyclone (a flow path through which air and fine dust may be tangentially introduced into the second cyclone to swirl along the inner circumference of the second cyclone), more second cyclones 25 can be arranged within the first cyclone 24. Therefore, even if employing the structure in which the second cyclones 25 is positioned in the first cyclone 24, a number of the second cyclones 25 may be not reduced, compared with other dust separating structure, thereby preventing deterioration of a cleaning performance.

A cover member (or cover plate) 253 may be provided on the upper portion of the second cyclones 25. The cover member 253 may be upwardly spaced apart from the inlet port 251 to cover the inlet port 251 of the second cyclone 25, thereby forming a second space 254 with the inlet port 251. The second space 254 may communicate with the first space 242. The second space 254 may horizontally extend in the second cyclone 25 and may communicate with the inlet port 251 of the second cyclone 25. With this structure, air within the first cyclone 24 may be introduced into the inlet port 251 located above the second cyclone 25 through the first space 242 and the second space 254.

The cover member 253 may be provided between the upper cover 22 and the housing 240, and a coupling portion 2532 may be formed on an outer circumferential portion of the cover member 253 to couple the upper cover 22 and the housing 240. As one example, one side of the outer circumferential portion of the cover member 253 may be coupled to the upper cover 22 and another side of the outer circumferential portion of the cover member 253 may be coupled to the housing 240. The upper cover 22, the cover member 253, and the housing 240 may be coupled by a coupling structure such as protrusions, protrusion accommodating grooves, or other connection structures.

The outer circumferential portion of the second cyclone 25 may be coupled to the cover member 253 and the housing 240 of the first cyclone 24 by a coupling structure such as protrusions, protrusion accommodating grooves, or other connection structure. A vortex finder 255 for discharging fine dust-separated air may be provided at an upper center of each second cyclone 25. The inlet port 251 may be defined as an annular space between the inner circumference of the second cyclone 25 and the outer circumference of the vortex finder 255.

The inlet port 251 of each second cyclone 25 may be provided with a guide vane 256 that extends spirally along the inner circumference thereof. The guide vane 256 may be provided on an outer circumference of the vortex finder 255 or may be integrally formed with the vortex finder 255. In this configuration, a rotating flow may be formed in the air flowing into the second cyclone 25 through the inlet port 251.

During a flow of air and fine dust introduced into the inlet port 251 of the second cyclone 25, the fine dust gradually flows down while spirally swirling along the inner circumference of the second cyclone 25 and then finally may be discharged through the outlet port 252, so as to be collected in the fine dust storage unit (or fine dust storage chamber) 263 of an inner case 26, to be explained later. The air that is relatively lighter than the fine dust may be discharged to the upper vortex finder 255 by the suction force of the fan unit. According to the structure of the second cyclone 25, a relatively uniform rotating flow may be generated over almost the entire area of the inlet 251 port.

The cover member 253 may be provided with a communication hole 2531 corresponding to the vortex finder 255. The cover member 253 may be provided to cover the inner space of the first cyclone 24 except for the vortex finder 255. The upper cover 22 may be provided over or on an upper portion of the cover member 253.

Meanwhile, the inner case 26, which accommodates the outlet port 252 of the second cyclone 25, may be provided below the first cyclone 24. A partition wall 262 extending in a horizontal direction may be provided inside the inner case 26. An outer circumferential portion of the partition wall 262 may be coupled to an inner circumferential surface of the inner case 26. The partition wall 262 and the inner case 26 may be coupled by a coupling structure such as protrusions, protrusion accommodating grooves, other connection structure.

The partition wall 262 may form a bottom surface of the first cyclone 24. The partition wall 262 may divide an inner space of the inner case 26 into an accommodation space for accommodating the second cyclone 25, and a fine dust storage unit 263 for collecting fine dust discharged through the outlet port 252 of the second cyclone 25. The accommodation space may be provided at an upper portion of the partition wall 262, and the fine dust storage unit 263 may be provided at a lower portion of the partition wall 262. The partition wall 262 may be spaced upwardly apart from a tapered portion (or tapered wall) 261 of the inner case 26.

The partition wall 262 may be provided with through holes for insertion of the second cyclones 25 there through. The lower portion of each second cyclone 25 may be inserted through the through hole of the partition wall 262 and may protrude into the fine dust storage unit 263.

The inner case 26 may extend toward the lower cover 23. The inner case 26 may be formed in a bowl shape having the tapered portion 261 with a sectional area, which may be narrower at a lower end than at an upper end and which is gradually decreased toward a lower side of the tapered portion 261. Upper and lower end portions (or edges) of the inner case 26 may be open in an up-and-down (i.e., vertical) direction. The upper end portion (or upper opening) of the inner case 26 may communicate with the first space 242 of the first cyclone 24, and the lower end portion (or lower opening) of the inner case 26 may communicate with the exterior of the outer case 21 when the lower cover 23 is opened, such that fine dust within the fins dust storage 263 can be removed when the lower cover 23 is opened. Here, the lower cover 23 may simultaneously open and close the dust storage unit 212 of the outer case 21 and the fine dust storage unit 263 of the inner case 26.

The inner case 26 may be coupled to the second cyclones 25 through a plurality of poles 264. Each of the plurality of poles 264 may be formed in a shape of a pipe on a lower surface (the tapered portion 261) of the inner case 26 to penetrate through the partition wall 262. Screws or other connection mechanisms may be inserted through the plurality of poles 264, respectively, via coupling holes formed at the tapered portion 261 of the inner case 26 so as to be coupled to the second cyclones 25.

Figure 8:
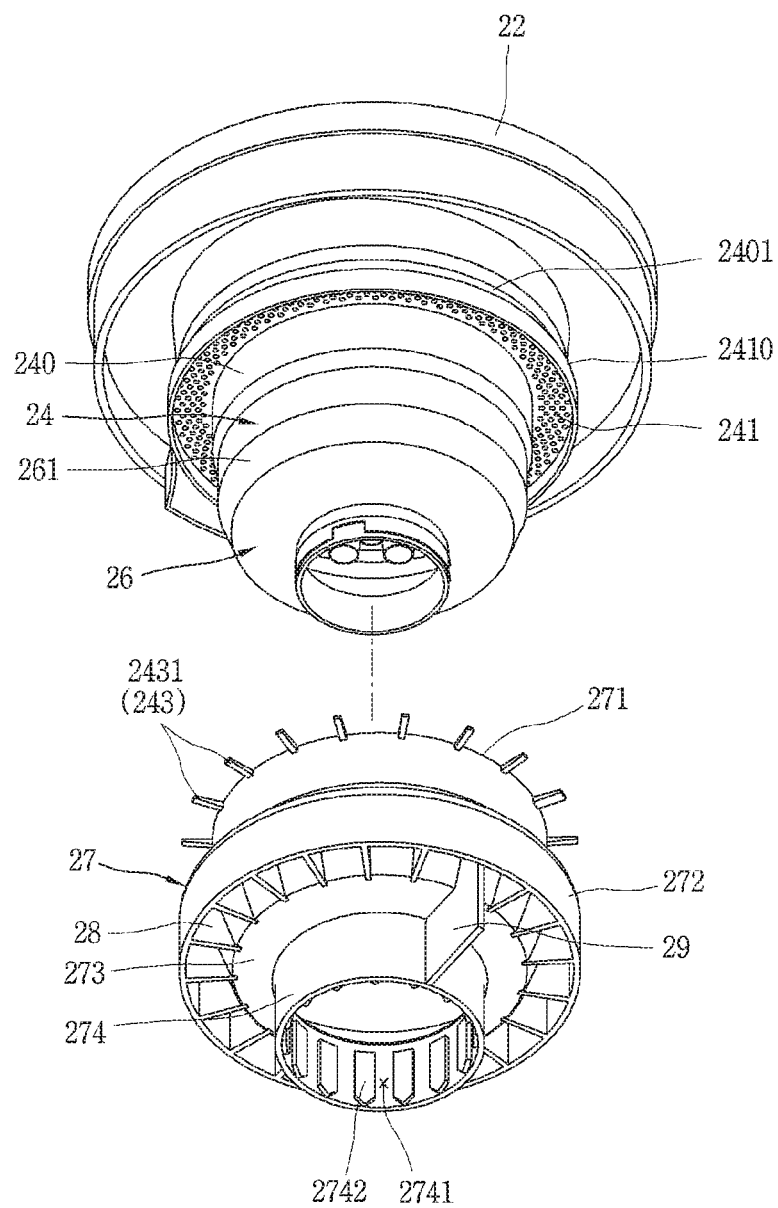
FIG. 8 is an exploded perspective view of a multi-cyclone assembly and a rotation unit in FIG. 4.

In the present disclosure, a cleaning unit 243 for removing foreign materials, dust, and other contaminants attached to the mesh filter 241 may be provided (see FIGS. 4-8). Referring to FIG. 8, the cleaning unit 243 may be provided on an upper end of the rotation unit (or rotation cylinder) 27. Specifically, the cleaning unit 243 may include a plurality of cleaning ribs 2431. The cleaning ribs 2431 may protrude radially from the upper end of the rotation unit 27 to contact a part of a lower surface of the mesh filter 241. The plurality of cleaning ribs 2431 may be spaced apart in a circumferential direction at predetermined intervals along an outer circumference of the rotation unit 27 (see FIG. 7).

Each of the plurality of cleaning ribs 2431 may be configured in a manner that an inner end portion in the radial direction may be integrally connected to an upper end of a rotating portion 271 of the rotation unit 27, and an outer end portion may be a free end. Each of the cleaning ribs 2431 may have an inclined surface on a lower surface so as to become thinner as the cleaning ribs 2431 extends radially outward.

As previously described, the mesh filter 241 may be fixedly connected to the housing 240 of the first cyclone 24. In contrast, the cleaning unit 243 may be connected to the rotation unit 27 to be rotatable together with the rotation unit 27. Thus, the cleaning unit 243 may be rotatable relative to the mesh filter 241. Hereinafter, a principle and operation of removing foreign materials, dust, and other contaminants attached to the mesh filter 241 by the cleaning unit 243 will be described with reference to FIG. 8.

The rotation unit 27 may rotate the cleaning ribs 2431 in the circumferential direction. In response to the rotation of the cleaning ribs 2431, foreign materials or dust attached to the bottom surface of the mesh filter 241 may be caught or otherwise contacted by the cleaning ribs 2431 and may be separated from the mesh filter 241 to fall downward (e.g., into the dust storage unit 212).

Figure 6:
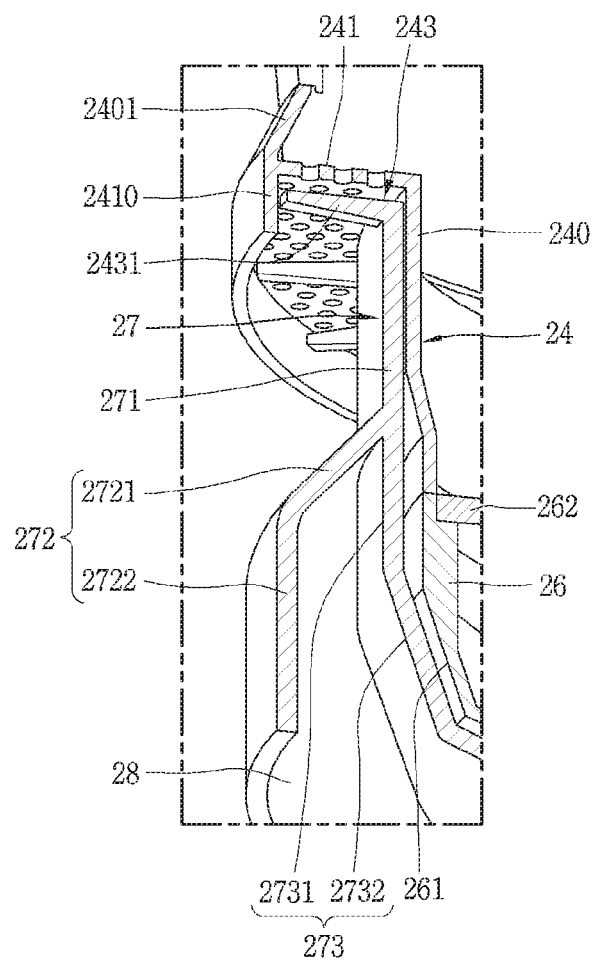
FIG. 6 is an enlarged perspective view of a rectangular box portion of FIG. 5, viewed from a bottom.
Figure 7:
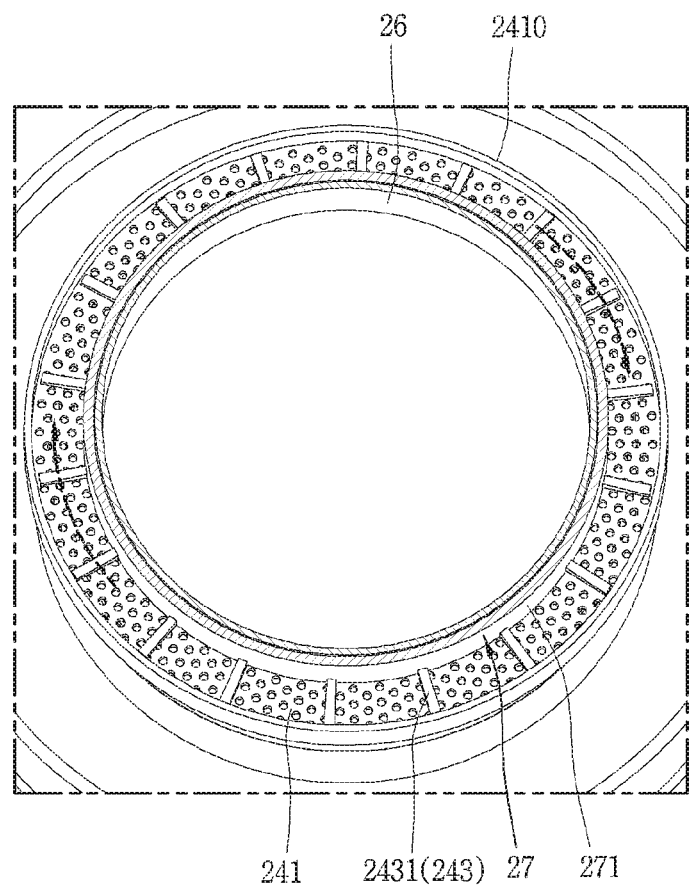
FIG. 7 is a conceptual view illustrating cleaning ribs that are arranged on an upper end portion of a rotation unit and are spaced apart from one another in a circumferential direction in FIG. 5.

An upper surface of each cleaning rib 2431 may face the mesh filter 241, and a lower surface of the cleaning rib 2431 may face an inclined surface of a skirt portion 272. As shown in FIG. 6, the cleaning ribs 2431 may be configured such that a thickness thereof decreases between an interior end connected to the outside of the rotation unit 27 and an opposite, radially distal end. For example, the upper surface of the cleaning rib 2431 may be formed as a flat surface, and the lower surface of the cleaning rib 2431 may be made included upward toward in the radial direction, such that a distance between the flat upper surface and the inclined lower surface of the cleaning rib decreases laterally outward away from the rotation unit 27.

A benefit for configuring each cleaning rib 2431 to be thinner toward the outside in the radial direction is described as follows. If it may be assumed that a torque transmitted from the rotation unit 27 to the cleaning ribs 2431 may be constant when the cleaning ribs 2431 may be collided with foreign materials attached to the filter 241, impact force decreases from the inner end portion to the outer end portion of each cleaning rib 2431 with respect to the radial direction of the rotation unit 27. Therefore, the inner end portion of the cleaning rib 2431 connected to the rotation unit 27 may be made thicker than the outer end portion of the cleaning rib 2431, to increase strength of the cleaning rib 2431.

Further, both side surfaces of each cleaning rib 2431 that contact the foreign materials or dust on the mesh filter 241 due to rotation by the rotation unit 27 may be inclined so that a width of a portion of cleaning rib 2431 becomes narrower from the inside to the outside in the radial direction. That is, each of the cleaning ribs 2431 may have an inverted triangular shape so that the widths of the both side surfaces become narrower away from the rotation unit 27 in a radial direction. According to this structure, the strength of the cleaning rib 2431 connected to the rotation unit 27 can be further increased, and foreign materials, dust or other contaminants contacted by the cleaning rib 2431 can be moved outward in a radial direction due to a centrifugal force to contact an inner surface of the filter guide 2410 and fall downward.

As previously described, when the cleaning unit 243 rotates, the foreign materials, dust, etc. may be partially moved outward in the radial direction due to the centrifugal force. At this time, the foreign materials or other contaminants moved outward in the radial direction then fall downward due to being stopped on the inner circumferential surface of the filter guide 2410. According to this structure, the filter guide 2410 can switch a flowing direction of air introduced into the filter from the radial direction to the upward direction, and also switch a moving direction of foreign materials from the centrifugal direction to the downward direction. Also, the filter guide 2410 can guide the foreign materials or dust to fall into the dust storage unit 212 without moving directly back to the mesh filter 241 in the annular space.

The rotation unit 27 may be configured to be rotatable in both circumferential directions (e.g., clockwise or counterclockwise) within the dust storage unit 212. The rotation unit 27 may be configured to a have a shape corresponding to an outer shape of the inner case 26 and to enclose the inner case 26. With the above structure, the inner case 26 may be configured to hold a rotation center when the rotation unit 27 may be rotated. Accordingly, even without a separate member for holding the rotation center of the rotation unit 27, the rotation unit 27 can be more stably rotated.

Figure 3:
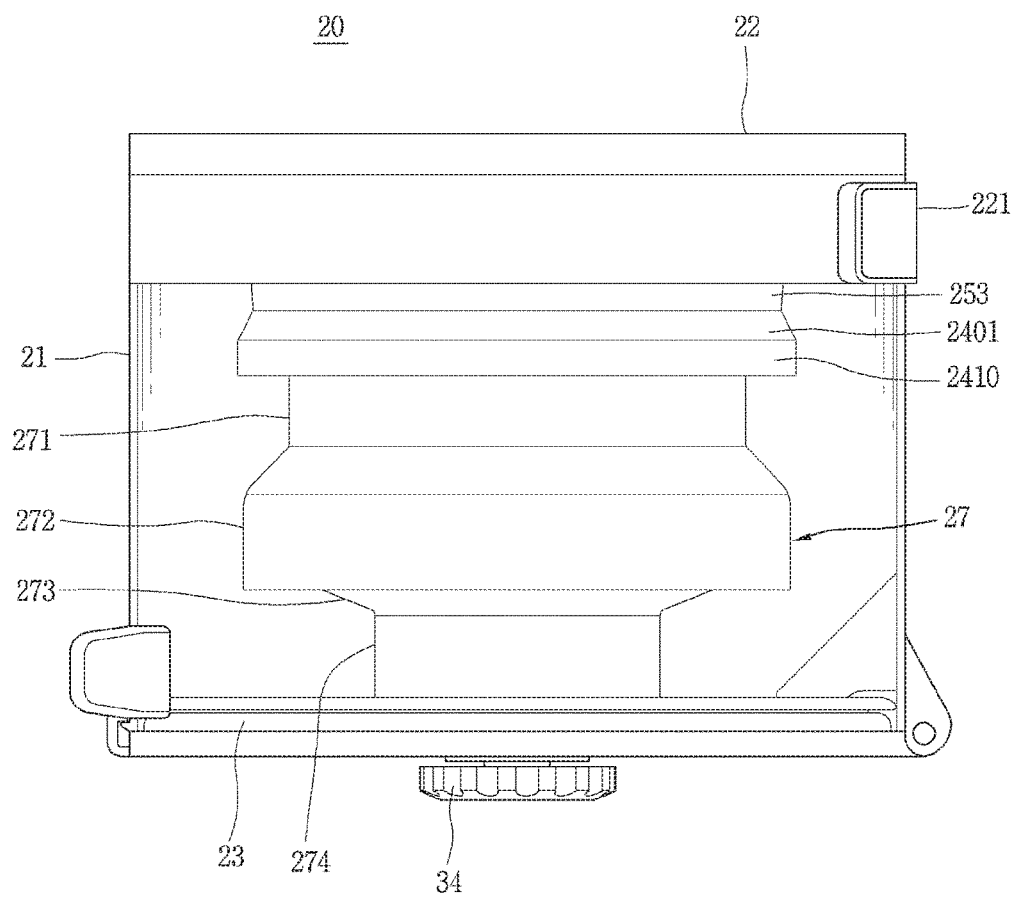
FIG. 3 is a lateral view of FIG. 2.

A shown in FIG. 3, the rotation unit 27 may structurally include a rotating portion (or rotating cylinder wall) 271, a skirt portion (or rotating skirt wall) 272, an inclined portion (or rotating inclined wall) 273, and a base portion (or rotating base wall) 274. The rotation portion 271 may be formed in a hollow cylindrical shape to surround the housing 240. The inner end portion of each cleaning rib 2431 may be connected to an upper end or edge of the rotation portion 271 so that the cleaning rib 2431 can be rotated in connection with a rotation of the rotation portion 271.

Referring to FIGS. 4 and 5, the skirt portion 272 may be provided with an inclined surface 2721 protruding from the rotating portion 271 so that a diameter thereof increases downward, and a perpendicular surface 2722 perpendicularly extends downward from a lower end of the inclined surface 2721. The inclined surface 2721 may be positioned to overlap the mesh filter 241 in the up-and-down direction (e.g., vertically), and may face the mesh filter 241 such that the inclined surface 2721 is vertically spaced apart from the mesh filter 241. The perpendicular surface 2722 may maintain a substantially same diameter from the inclined surface 2721 in the downward direction. A preset interval may be formed between the perpendicular surface 2722 and the inner circumferential surface of the outer case 21 to facilitate relatively large foreign materials to be discharged through a gap between the skirt portion 272 and the inner circumferential surface of the outer case 21 (e.g., to the dust storage unit 212). According to the structure of the skirt portion 272, the skirt portion 272 can prevent a backward flow and scattering of the foreign materials or dust stored in the dust storage unit 212, thereby minimizing blockage of the mesh filter 241 due to re-scattered dust or other contaminants from in the dust storage unit 212.

The inclined portion 273 may extend radially inward from the rotating portion 271 into a shape corresponding to the tapered portion 261 of the inner case 26, so as to enclose the tapered portion 261. For example, the inclined portion 273 may be provided with a first inclined portion (or first inclined surface) 2731 extending from the rotating portion 271 by a relatively steep inclination (e.g., an inclination or slope greater than 1), and a second inclined portion (or second inclined surface) 2732 extending from the first inclined portion 2731 by a relatively smoother inclination (e.g., an inclination or slope smaller than 1).

The base portion 274 may extend from a lower end of the inclined portion 273 in a perpendicularly downward direction. The base portion 274 may be formed to have a smaller diameter than the skirt portion 272. As shown in FIG. 8, a plurality of coupling grooves 2741 and a plurality of coupling protrusions 2742 may be formed on an inner circumferential surface of the base portion 274. For example, the plurality of coupling protrusions 2742 may extend from the inner circumferential surface of the base portion 274 in a perpendicular direction (e.g., radially inward), and the plurality of coupling grooves 2741 may be defined between adjacent pairs of the coupling protrusions 2742. The plurality of coupling grooves 2741 may be arranged to extend vertically and to be spaced apart from one another in a circumferential direction along the inner circumferential surface of the base portion 274. The plurality of coupling grooves 2741 and coupling protrusions 2742 may be arranged alternately along the circumferential direction. The plurality of coupling grooves 2741 and/or the coupling protrusions 2742 may receive a driving force (or rotational force) to rotate the rotation unit 270 from a driving force transmitting unit to be described later.

As shown in FIG. 5, a locking portion (or locking protrusion) 2743 may protrude from a lower end portion of the outer circumferential surface of the inner case 26. A rotation supporting groove 2744 may be formed on the outer circumferential surface of the inner case 26, such as on an upper portion of the locking portion 2743 along the circumferential direction. The locking portion 2743 may be detachably coupled to the inner case 26 using a screw or other connector.

A rotation supporting portion (or rotation supporting extension) 2745 may be formed along the circumferential direction to radially protrude from an inner circumferential surface of the base portion 274, and a rotation supporting protrusion 2646 may upwardly protrude from an end portion of the rotation supporting portion 2746. The rotation supporting protrusion 2746 may be inserted into the rotation supporting groove 2744, and thus the rotation unit 27 may be rotatably supported with being locked on the locking portion 2743 of the inner case 26 with respect to the gravity direction. With the structure of the locking portion 2743, the rotation unit 27 may be coupled to the inner case 26, such that the rotation unit 27 may be fixed in place even when the lower cover 23 is rotated downward (e.g., at a hinge on outer case 21) to open the dust storage unit 212.

As shown in FIGS. 5 and 6, the skirt portion 272 may protrude downward to be lower than the first inclined portion 2731. A rolling portion (or rolling ribs) 28 may be formed at a lower end portion of the protruded skirt portion 272. The rolling portion 28 may include a plurality of rolling ribs extending radially between the inner circumferential surface of the skirt portion 272 and the outer circumferential surface of the inclined portion 273. The plurality of rolling ribs may be spaced apart with one another at predetermined intervals in the circumferential direction. Each of the plurality of rolling ribs may be provided toward the lower cover 23.

The rolling portion 28 rotates together with the rotation unit 27 so that a portion of the foreign materials and dust collected in the dust storage unit 212 may be rolled (e.g., moved in a rotational direction of the rotation unit 27) due to being bumped against or otherwise contacting the plurality of rolling ribs. Accordingly, the foreign materials and dust may be rolled into a compacted bundle having a spherical shape. When the foreign materials and the dust may be bundled into the spherical shape by the rolling portion 28, the backward flow of the foreign materials and dust (e.g., a phenomenon in which the foreign materials and dust in the dust storage unit 212 may accumulate to extend into the annular space 211 between the first cyclone 24 and the outer case 21) can be prevented up to a predetermined level. When the rolling portion 28a is used in combination with a pressing portion (or pressing wall) 29 (described below), the foreign materials and the dust in the dust storage unit 212 may be further agglomerated and compressed, which may result in further improving a dust collecting performance of the foreign materials and the dust and thus remarkably reducing the possibility of the backward flow. Also, scattering of the dust can be minimized when the dust storage unit 212 is emptied by opening the lower cover 23.

The pressing portion 29 may radially extend from the rotation unit 27, namely, from the base portion 274 and one side of the outer circumferential surface of the inclined portion 273. An extending length of the pressing portion 29 may be equal to or longer than an outer diameter of the skirt portion 272. For example, the extending length of the pressing portion 29 in the radial direction may be the same as that of the skirt portion 272. The pressing portion 29 can compress the foreign materials and dust in the dust storage unit 212 in the pressing manner, in response to the rotation together with the rotation unit 27

An inner wall 291 for collecting dust moved to one side by the rotation of the pressing portion 29 may be provided within the dust storage unit 212. This embodiment illustrates that the inner wall 291 extends in the radial direction from a lower inner circumference of the outer case 21. The dust or other contaminants that have been introduced into the dust storage unit 212 may be collected at both sides of the inner wall 291, in response to the rotation of the pressing portion 29.

Figure 9:
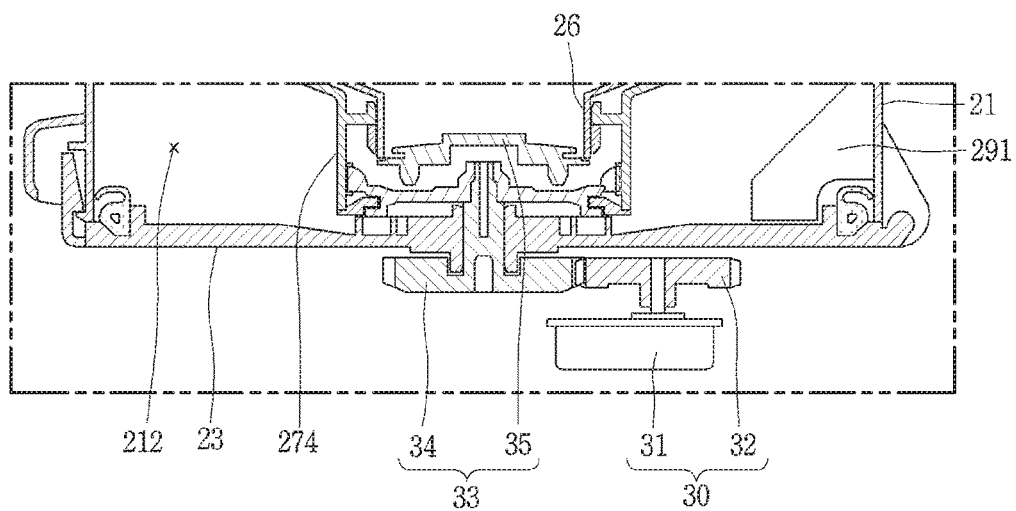
FIG. 9 is a conceptual view illustrating a state where driving force generated from a driving unit is transmitted to a rotation unit through a driving force transmitting unit.

FIG. 8 is an exploded perspective view of the multi-cyclone assembly and the rotation unit 27 in FIG. 4, and FIG. 9 is a conceptual view illustrating a state in which the driving force generated from a driving unit 30 is transmitted to the rotation unit 27 through a driving force transmitting unit 33. The driving unit 30 may be provided in the cleaner body 10, and may include a driving motor 31 and a driving gear 32 connected to the driving motor 31. The driving gear 32 configured to be rotatable and is driven by the driving motor. At least a part of the driving gear 32 may be exposed from the cleaner body 10, so as to be engaged with a driven gear 34 of the driving force transmitting unit 33 when the dust collector 20 is mounted to the cleaner body 10.

The driving force transmitting unit 33 may be provided on the lower cover 23, and may transmit the driving force of the driving unit 30 to the rotation unit 27. The driving force transmitting unit 33 includes a driven gear 34 and a coupling member 35 (or coupling shaft). The driven gear 34 may be exposed to a lower portion of the lower cover 23, and may be configured to be rotatable relative to the lower cover 23. The driven gear 34 may be configured to receive the driving force of the driving motor 31 by being engaged with the driving gear 32 when the dust collector 20 is coupled to the cleaner body 10.

The coupling member 35 may be connected to the driven gear 34 by a rotating shaft, and may be configured to be rotatable together with the driven gear 34. The coupling member 35 may be exposed to an upper portion of the lower cover 23, so as to be coupled to a coupling groove provided on an inner circumference of the base portion 274 when the lower cover 23 may be coupled to the outer case 21. In one embodiment, multiple coupling groove 2731 may be formed on the inner circumference of the base portion 274 and are spaced apart from one another by predetermined intervals, and the coupling member 35 may be formed in a shape of a gear with a plurality of coupling protrusions that are inserted into the coupling grooves 2731. In consideration of this shape, the coupling member 35 may also be called a coupling gear.

With this structure, when the lower cover 23 may be coupled to the outer case 21, the driving force transmitting unit 33 may be connected to the rotation unit 27 of the dust collector 20. When the dust collector 20 is coupled to the cleaner body 10, the driving force transmitting unit 33 may be connected to the driving unit 30 of the cleaner body 10, such that a driving force generated from the driving unit 30 can be transferred to the rotation unit 27 through the driving force transmitting unit 33.

The rotation of the driving motor 31 may be controlled so that a bidirectional rotation of the rotation unit 27 occurs. For example, the driving motor 31 may be made change to rotate in an opposite direction from a current rotating direction when a repulsive force is applied in the opposite direction. That is, when the pressing portion 29 rotates in one direction to compress dust collected on one side by a predetermined level, the driving motor 31 may rotate in another direction to compress dust collected on another side.

When the dust storage unit 212 is relatively empty, insufficient dust may be present in the dust storage unit 212 to cause the driving motor 31 to change the rotating direction, and the pressing portion 29 may be rotate until bumping against the inner wall 291 or another stopper structure (not illustrated) provided on a rotating path of the pressing portion 29. In another example, a controller in the cleaner body 10 (not shown) may apply a control signal by the driving motor 31 to change the rotating direction of the pressing portion 29 after predetermined time intervals, to allow for the repetitive bidirectional rotation of the pressing portion 29.

The pressing portion 29 may allow the dust collected in the dust storage unit 212 to be gathered or compressed in a predetermined area. Therefore, the scattering of dust can be suppressed while opening the lower cover 23 to discard the stored dust, and a possibility that the dust is discharged to an unintended place can be remarkably reduced.

As described above, according to the present disclosure, the rotation unit 27 can be rotated by receiving the driving force generated from the driving motor 31 through the driving force transmitting unit 33 during an operation of the cleaner, and the cleaning unit 243 can perform cleaning of the mesh filter 241 by sweeping foreign materials, dust or other contaminants attached to the mesh filter 241 into the dust storage unit 212.

A user can automatically perform the cleaning of the mesh filter 241 while the cleaner is in use and can also clean the mesh filter 241 manually when the cleaner is not used. For example, the mesh filter 241 can be cleaned even when the driven gear 34 on the lower portion of the lower cover 23 is manually rotated when the dust collector 20 is detached from the cleaner body 10.

Therefore, one aspect of the present disclosure provides a vacuum cleaner capable of minimizing clogging of a filter during an operation of the vacuum cleaner. A second aspect of the present disclosure provides a vacuum cleaner capable of facilitating foreign materials or dust to easily fall downward into a dust storage unit without being accumulated on a cleaning unit. A third aspect of the present disclosure provides a vacuum cleaner capable of preventing filter clogging due to re-scattering of foreign materials or dust when the foreign materials or dust fall downward into a dust storage unit from a filter by a cleaning unit.

To achieve these and other aspects of this specification, as embodied and broadly described herein, there is provided a vacuum cleaner including a cleaner body, and a dust collector provided in the cleaner body, wherein the dust collector includes an outer case having a dust storage unit therein, an upper cover mounted to cover an upper portion of the outer case, a lower cover rotatably coupled to a lower portion of the outer case, a first cyclone provided inside the outer case, and having a mesh filter to filter dust and foreign materials from air suctioned from outside such that the air without the dust and foreign materials is introduced therein, a second cyclone accommodated in the first cyclone, and configured to separate fine dust from the air introduced into the first cyclone, a cleaning unit configured to sweep dust and foreign materials attached to the mesh filter along an outer circumferential surface of the mesh filter, and a rotation unit coupled to the cleaning unit to rotate the cleaning unit relative to the mesh filter.

According to an embodiment of the present disclosure, the first cyclone may be provided with a housing formed in a cylindrical shape to surround the second cyclone, and the mesh filter may be provided with a plurality of through holes, and protrude in a radial direction from an upper portion of the housing to extend along a circumferential direction.

According to an embodiment of the present disclosure, the plurality of through holes may be formed in a penetrating manner in an up-and-down direction, and a moving direction of air introduced through the through holes may be parallel to an axial direction of the outer case.

According to an embodiment of the present disclosure, the cleaning unit may be provided with a plurality of cleaning ribs protruding in the radial direction from an upper portion of the rotation unit to drop foreign materials attached to (piled on, accumulated on) the mesh filter in a downward direction. Each of the plurality of cleaning ribs may be inclined so as to be gradually thinner toward outside in the radial direction.

According to an embodiment of the present disclosure, the rotation unit may include a rotating portion extending from an inner end portion of each cleaning rib toward the lower cover, and a skirt portion having an inclined surface protruding in a manner that a diameter thereof gradually increases in a downward direction.

According to an embodiment of the present disclosure, the inclined surface of the skirt portion may face the mesh filter with being spaced apart from the mesh filter in an up-and-down direction.

According to an embodiment of the present disclosure, the cleaner may further include an inner case provided within the outer case so as to cover a bottom surface of the first cyclone, and provided with a tapered portion tapered so that a sectional area thereof is reduced from an upper end to a lower end. The rotation unit may include an inclined portion formed on a lower portion of the rotating portion to correspond to the tapered portion, and a base portion extending downward from a lower end of the inclined portion, and having coupling grooves formed on an inner circumferential surface thereof with being spaced apart from one another in a circumferential direction. The rotation unit may be coupled to the inner case to be rotatable relative to the inner case.

According to an embodiment of the present disclosure, the rotation unit may further include a pressing portion protruding radially from the base portion toward the skirt portion to press the dust collected in the dust storage unit.

According to an embodiment of the present disclosure, the rotation unit may further include a rolling portion constituted as a plurality of ribs extending in the radial direction between the base portion and the skirt portion, to roll the dust and foreign materials collected in the dust storage unit together.

According to an embodiment of the present disclosure, the cleaner may further include a driving unit provided in the cleaner body to drive the rotation unit, and the driving unit may be provided with a driving motor, and a driving gear connected to the driving motor. According to an embodiment of the present disclosure, the cleaner may further include a driving force transmitting unit to transmit driving force from the driving unit to the rotation unit. The driving force transmitting unit may include a driven gear mounted on the lower cover so as to be exposed to a lower portion of the lower cover, and engaged with the driving gear when the dust collector is mounted on the cleaner body, and a coupling member coupled to the driven gear so as to be exposed to an upper portion of the lower cover, and engaged with the coupling grooves when the lower cover is coupled to the outer case.

According to the present disclosure having the aforementioned configuration, the following effects can be obtained. First, a cleaning unit can automatically/manually clean a filter surface during an operation of a vacuum cleaner, so that the filter surface can be kept clean and a load on a fan unit caused due to foreign materials or dust can be reduced.

Second, since the filter may be provided on an upper horizontal surface other than a side surface of a housing, and ribs of the cleaning unit may be arranged in a radial direction other than an up-and-down direction, which can facilitate foreign materials, dust and other contaminants attached to a filter unit to fall downward.

Third, the cleaning unit may be configured to be rotatable relative to the filter, and a surface of the filter to which foreign materials or dust may be accumulated (attached) is provided to face a downward side, so that the foreign materials can be removed more efficiently by the gravity.

Fourth, a skirt portion may protrude in a radial direction to overlap the filter surface in an up-and-down direction, thereby minimizing clogging of the filter due to a backward flow and re-scattering of the foreign materials and dust.

Fifth, since the filter is automatically cleaned by the cleaning unit during the operation of the vacuum cleaner, there is no need for a consumer to clean the filter separately after stopping the vacuum cleaner, thereby simplifying the consumer's management of filter cleaning.

Sixth, during the operation of the vacuum cleaner, dust stored in a dust storage unit may be compressed by a pressing portion and agglomerated by a rolling portion, so as to minimize a volume of foreign materials and dust, thereby reducing a number of times of emptying the dust storage unit, and also reducing a flow of foreign materials or dust back to an upper portion of the dust storage unit and scattering of the dust while emptying the dust.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to use such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A cleaner, comprising:
   a cleaner body; and
   a dust collector provided in the cleaner body, wherein the dust collector includes:
      an outer case having a dust storage chamber therein;
      an upper cover mounted in an upper opening of the outer case;
      a lower cover mounted in a lower opening of the outer case;
      a first cyclone provided inside the outer case the first cyclone and having a mesh filter configured to remove first materials from suctioned air and to introduce filtered air within the first cyclone;
      a second cyclone provided in the first cyclone, and configured to separate second materials from the air introduced into the first cyclone;
      a cleaning rib positioned adjacent to a horizontal surface of the mesh filter; and
      a rotation cylinder coupled to the cleaning rib and configured to rotate such that the cleaning rib is moved along the horizontal surface of the mesh filter to remove first materials from the horizontal surface of the mesh filter,
   wherein the first cyclone includes a housing formed in a cylindrical shape to surround the second cyclone,
   wherein the mesh filter is provided with a plurality of through holes, and extends in a radial direction from an upper surface of the housing, and
   wherein the cleaning rib is included in a plurality of cleaning ribs protruding in the radial direction from an upper portion of the rotation cylinder to be positioned adjacent to the horizontal surface of the mesh filter, and wherein plurality cleaning ribs, when moved by the rotation cylinder, cause first materials attached to the mesh filter to drop in a downward direction to the dust storage chamber.

2. The cleaner of claim 1, wherein the plurality of through holes are formed to penetrate vertically into the mesh filter, and a moving direction of air introduced through the through holes is parallel to an axial direction of the outer case.

3. The cleaner of claim 1, wherein each of the plurality of cleaning ribs is inclined so as to be gradually thinner toward outside in the radial direction away from the rotation cylinder.

4. The cleaner of claim 1, wherein the rotation cylinder includes:
   a rotating cylinder wall extending from an inner end portion of each of the cleaning ribs toward the lower cover; and
   a rotating skirt wall having an inclined surface that includes a top edge coupled to the rotating cylinder wall and a diameter that gradually increases in a downward direction from the top edge.

5. The cleaner of claim 4, wherein the inclined surface of the rotating skirt wall faces and is vertically spaced apart from the mesh filter.

6. The cleaner of claim 4, further comprising an inner case provided within the outer case so as to cover a bottom surface of the first cyclone, and provided with a tapered wall with a cross-sectional area that is reduced from an upper end to a lower end thereof,
   wherein the rotation cylinder includes:
      a rotating inclined wall coupled to a lower edge of the rotating cylinder wall and shaped to correspond to the tapered wall; and
      a rotating base wall extending downward from a lower edge of the rotating inclined wall, and having coupling grooves formed on an inner circumferential surface thereof that are spaced apart from one another in a circumferential direction, wherein the rotation cylinder is coupled to and is rotatable relative to the inner case.

7. The cleaner of claim 6, wherein the rotation cylinder further includes:
   a pressing wall protruding radially from the rotating base wall toward the rotating skirt wall to press first materials in the dust storage chamber.

8. The cleaner of claim 6, wherein the rotation cylinder further includes a rolling ribs extending in the radial direction between the rotating base wall and the rotating skirt wall to contact first materials in the dust storage chamber.

9. The cleaner of claim 6, further comprising:
   a driving motor provided in the cleaner body to generate a driving force,
   a driving gear connected to the driving motor and transferring the driving force to the rotation cylinder.

10. The cleaner of claim 9, further comprising:
    a driven gear mounted on the lower cover so as to be exposed to a lower portion of the lower cover, and engaged with the driving gear when the dust collector is mounted on the cleaner body; and
    a coupling gear coupled to the driven gear so as to be exposed to an upper portion of the lower cover, and engaged with coupling grooves when the lower cover is coupled to the outer case.

11. A cleaner, comprising:
    a cleaner body;
    a dust collector provided in the cleaner body, wherein the dust collector includes:
       an outer case having a dust storage chamber therein;
       an upper cover mounted in an upper opening of the outer case;
       a lower cover mounted in a lower opening of the outer case;
       a first cyclone provided inside the outer case the first cyclone and having a mesh filter configured to remove first materials from suctioned air and to introduce filtered air within the first cyclone;
       a cleaning rib positioned adjacent to a horizontal surface of the mesh filter; and
       a rotation cylinder coupled to the cleaning rib and configured to rotate such that the cleaning rib is moved along the horizontal surface of the mesh filter to remove first materials from the horizontal surface of the mesh filter;
    a driving motor provided in the cleaner body to generate a driving force to rotate the rotation cylinder;
    a driving gear connected to the driving motor and transferring the driving force to the rotation cylinder; and a gear that extends through the lower cover to transfer the driving force from the driving gear to the rotation cylinder, wherein the gear includes
  a driven gear mounted on the lower cover so as to be exposed to a lower portion of the lower cover, and engaged with the driving gear when the dust collector is mounted on the cleaner body; and
  a coupling gear coupled to the driven gear so as to be exposed to an upper portion of the lower cover, and engaged with an interior surface of the rotation cylinder, and
wherein coupling grooves are formed on the interior surface of the rotation cylinder, and the coupling gear engages the coupling grooves when the lower cover is closed on the lower opening of the outer case.

12. The cleaner of claim 11, wherein the first cyclone includes a housing formed in a cylindrical shape, and
  wherein the mesh filter extends in a radial direction from an upper surface of the housing, and a moving direction of air introduced through the mesh filter is parallel to an axial direction of the outer case.

13. The cleaner of claim 11, further comprising:
  a second cyclone provided in the first cyclone, and configured to separate second materials from the air introduced into the first cyclone through the mesh filter.
  an inner case provided within the outer case so as to cover a bottom surface of the first cyclone to define a fine dust storage chamber to receive the second materials.

14. The cleaner of claim 13, wherein the lower cover is hingedly connected to the outer case such that rotating the lower cover to expose the lower opening concurrently opens both the dust storage chamber and the fine dust storage chamber.

15. The cleaner of claim 13, wherein the second cyclone includes:
  a plurality of casings each having a conical shape,
  wherein one or more of the casings contact an inner surface of the first cyclone, and the plurality of casings define a first space forming a flow path for guiding air introduced in the first cyclone to the second cyclone.

* * * * *